United States Patent
Park et al.

(10) Patent No.: US 12,418,169 B2
(45) Date of Patent: Sep. 16, 2025

(54) DIRECT CURRENT/DIRECT CURRENT CONVERTER AND CONTROL METHOD THEREOF

(71) Applicant: LG INNOTEK CO., LTD., Seoul (KR)

(72) Inventors: Heo Kyoung Park, Seoul (KR); Min Jae Lee, Seoul (KR); Da Ul Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 217 days.

(21) Appl. No.: 18/254,517

(22) PCT Filed: Aug. 31, 2021

(86) PCT No.: PCT/KR2021/011655
§ 371 (c)(1),
(2) Date: May 25, 2023

(87) PCT Pub. No.: WO2022/114463
PCT Pub. Date: Jun. 2, 2022

(65) Prior Publication Data
US 2024/0006874 A1    Jan. 4, 2024

(30) Foreign Application Priority Data

Nov. 26, 2020  (KR) .................. 10-2020-0160980

(51) Int. Cl.
*H02H 7/12* (2006.01)
(52) U.S. Cl.
CPC ................. *H02H 7/1213* (2013.01)
(58) Field of Classification Search
CPC ........ H02H 7/1213; H02M 5/45; H02M 1/32; H02M 1/36
See application file for complete search history.

(56) References Cited

U.S. PATENT DOCUMENTS

| | | |
|---|---|---|
| 2010/0080022 A1 | 4/2010 | Schmidt |
| 2011/0175662 A1 | 7/2011 | Said El-Barbari et al. |

(Continued)

FOREIGN PATENT DOCUMENTS

| | | |
|---|---|---|
| EP | 3 531 543 A1 | 8/2019 |
| JP | 2017-169264 A | 9/2017 |

(Continued)

OTHER PUBLICATIONS

Supplementary European Search Report dated Sep. 23, 2024 in European Application No. 21898290.8.

(Continued)

*Primary Examiner* — Rexford N Barnie
*Assistant Examiner* — Christopher J Clark
(74) *Attorney, Agent, or Firm* — Saliwanchik, Lloyd & Eisenschenk (57) ABSTRACT

According to an embodiment, provided is a direct current/direct current converter comprising: a first switch unit located between a direct current link capacitor and a bridge circuit unit; a second switch unit connected in parallel with the first switch unit; a sensing unit for sensing a voltage across both ends of an inverter and a voltage across both ends of a second switch; and a control unit which controls an on-off operation of the first switch unit and the second switch unit, and determines whether a short circuit or a disconnection occurs by using the voltage across both ends of the inverter and the voltage across both ends of the second switch unit, wherein the control unit determines whether a short circuit or a disconnection occurs by using a voltage across both ends of the inverter and a voltage across both ends of the second switch unit, which are measured when the first switch unit is in an on state and the second switch unit is in an off state, and determines whether a disconnection occurs by using a voltage across both ends of the inverter, (Continued)

which is measured when the second switch unit is in an on state and the first switch unit is in an off state.

20 Claims, 7 Drawing Sheets

(56) References Cited

U.S. PATENT DOCUMENTS

| | | | |
|---|---|---|---|
| 2019/0267913 A1* | 8/2019 | Lim | H02M 7/062 |
| 2020/0076295 A1* | 3/2020 | Nohata | H02M 7/5387 |
| 2020/0083727 A1* | 3/2020 | Sun | H02M 7/797 |
| 2020/0321880 A1 | 10/2020 | Lee et al. | |
| 2022/0037983 A1* | 2/2022 | Jiao | H02J 3/32 |

FOREIGN PATENT DOCUMENTS

| | | |
|---|---|---|
| JP | 2018-148674 A | 9/2018 |
| KR | 10-2018-0128155 A | 12/2018 |
| KR | 10-2020-0099267 A | 8/2020 |

OTHER PUBLICATIONS

International Search Report dated Nov. 29, 2021 in International Application No. PCT/KR2021/011655.

\* cited by examiner

DIRECT CURRENT/DIRECT CURRENT CONVERTER AND CONTROL METHOD THEREOF

CROSS-REFERENCE TO RELATED APPLICATIONS

This application is the U.S. national stage application of International Patent Application No. PCT/KR2021/011655, filed Aug. 31, 2021, which claims the benefit under 35 U.S.C. § 119 of Korean Application No. 10-2020-0160980, filed Nov. 26, 2020, the disclosures of each of which are incorporated herein by reference in their entirety.

TECHNICAL FIELD

One embodiment of the present invention relates to a direct current/direct current (DC/DC) converter and a control method thereof.

BACKGROUND ART

Electric energy is easily converted and transmitted, and thus is widely used. In order to efficiently use this electric energy, an energy storage system (ESS) is used. The energy storage system receives power and charges the power in a battery. Further, when power is required, the energy storage system supplies the power by discharging the power charged in the battery. Accordingly, the energy storage system can flexibly supply power.

Specifically, a power supply system operates as follows when including the energy storage system. The energy storage system discharges electric energy stored in the battery when a load or system is in an overload. Further, when the load or system is in a light load, the energy storage system receives power from a power generation apparatus or system and charges the power in the battery.

In addition, when the energy storage system is present independently of the power supply system, the energy storage system receives idle power from an external power source and charges the idle power in the battery. In addition, when a system or load is in an overload, the energy storage system supplies the power by discharging the power charged in the battery.

Meanwhile, a direct current/direct current (DC-DC) converter applied to the energy storage system operates in a state in which detection of a short circuit and a disconnection is not performed. The DC-DC converter can cause damage to components and damage to workers when operating in a short-circuited or disconnected state.

DISCLOSURE

Technical Problem

The present invention is directed to providing a direct current/direct current (DC/DC) converter capable of performing detection of a short circuit and a disconnection, and a control method thereof.

Technical Solution

According to an embodiment, a direct current/direct current (DC/DC) converter control method includes: turning on a first switch unit located between a direct current link capacitor and a bridge circuit unit; determining whether a short circuit (short) occurs after a first set time has elapsed; determining whether the short circuit and a disconnection (open) occur after a second set time has elapsed; measuring a voltage across both ends of a second switch unit connected in parallel with the first switch unit; comparing the voltage across both ends of the second switch unit and a preset voltage to determine whether the short circuit occurs; turning on the second switch unit; turning off the first switch unit, and determining whether the disconnection occurs after a third set time has elapsed from a time when the first switch unit is turned off.

The determining of whether the short circuit (short) occurs after the first set time has elapsed may include comparing a preset first reference voltage value and a preset first reference current value with a first inverter voltage value and a first inverter current value measured at both ends of an inverter and determining whether the short circuit occurs.

The determining of whether the short circuit and the disconnection (open) occur after the second set time has elapsed may include comparing a preset second reference voltage value and a preset second reference current value with a second inverter voltage value and a second inverter current value measured at both ends of an inverter and determining whether the short circuit and the disconnection occur.

The determining of whether the disconnection occurs after the third set time has elapsed may include comparing a preset third reference voltage value and a preset third reference current value with a third inverter voltage value and a third inverter current value measured at both ends of an inverter and determining whether the short circuit and the disconnection occur.

The comparing of the voltage across both ends of the second switch unit and the preset voltage to determine whether the short circuit occurs may include determining that the short circuit occurs when the voltage across both ends of the second switch unit is maintained under the preset voltage for a preset time.

The DC/DC converter control method may further include outputting at least one of a control command for stopping an operation of a converter and a control command for reducing a voltage of an inverter end when the short circuit or the disconnection occurs.

According to an embodiment, a DC/DC converter includes: a first switch unit located between a direct current link capacitor and a bridge circuit unit, a second switch unit connected in parallel with the first switch unit; a sensing unit configured to sense a voltage across both ends of an inverter and a voltage across both ends of a second switch; and a control unit configured to control an on-off operation of the first switch unit and the second switch unit, and determine whether a short circuit and a disconnection occur using the voltage across both ends of the inverter and the voltage across both ends of the second switch unit, wherein the control unit determines whether the short circuit and the disconnection occur using the voltage across both ends of the inverter and the voltage across both ends of the second switch unit, which are measured when the first switch unit is turned on and the second switch unit is turned off, and determines whether the disconnection occurs using the voltage across both ends of the inverter, which is measured when the second switch unit is turned on and the first switch unit is turned off.

The first switch unit may include a resistor element and a switching element connected to the resistor element in series.

The control unit may sequentially perform arithmetic operations of determining whether a short circuit (short) occurs after a first set time has elapsed after turning on the first switch unit, determining whether the short circuit and a disconnection (open) occur after a second set time has elapsed, and comparing the voltage across both ends of the second switch unit and a preset voltage to determine whether the short circuit occurs, and may determine whether the disconnection occurs after a third set time has elapsed after turning on the second switch unit, and turning off the first switch unit.

The control unit may output at least one of a control command for stopping an operation of a converter and a control command for reducing a voltage of an inverter end when the short circuit or the disconnection occurs.

The control unit may compare a preset first reference voltage value and a preset first reference current value with a first inverter voltage value and a first inverter current value measured at both ends of the inverter after a first set time has elapsed to determine whether the short circuit occurs.

The control unit may compare a preset second reference voltage value and a preset second reference current value with a second inverter voltage value and a second inverter current value measured at both ends of the inverter after the second set time has elapsed to determine whether the short circuit and the disconnection occur.

The control unit may compare a preset third reference voltage value and a preset third reference current value with a third inverter voltage value and a third inverter current value measured at both ends of the inverter after the third set time has elapsed to determine whether the short circuit and the disconnection occur.

Advantageous Effects

According to the present invention, in a DC/DC converter and a control method thereof, it is possible to perform detection of a short circuit and a disconnection of the DC/DC converter.

Further, breakage of a circuit and a personal injury can be inhibited by stopping an operation and reducing a voltage of an inverter end when the short circuit or the disconnection is detected.

In addition, precise short circuit detection and disconnection detection can be performed regardless of a change in resistance value according to a temperature of a resistor for inhibiting overcurrent.

In addition, stability can be secured by causing a fault when connecting an inverter over an operation range previously agreed with an inverter company to inhibit an operation.

MODES OF THE INVENTION

Hereinafter, preferable embodiments of the present invention will be described in detail with reference to the accompanying drawings.

However, the technical spirit of the present invention is not limited to some embodiments which will be described and may be embodied in various forms, and one or more elements in the embodiments may be selectively combined and replaced to be used within the scope of the technical spirit of the present invention.

Further, terms used in the embodiments of the present invention (including technical and scientific terms), may be interpreted with meanings that are generally understood by those skilled in the art unless particularly defined and described, and terms which are generally used, such as terms defined in a dictionary, may be understood in consideration of their contextual meanings in the related art.

In addition, terms used in the description are provided not to limit the present invention but to describe the embodiments.

In the specification, the singular form may also include the plural form unless the context clearly indicates otherwise and may include one or more of all possible combinations of A, B, and C when disclosed as at least one (or one or more) of "A, B, and C."

In addition, terms such as first, second, A, B, (a), (b), and the like may be used to describe elements of the embodiments of the present invention.

These terms are only provided to distinguish the elements from other elements, and the essence, sequence, order, or the like of the elements are not limited by the terms.

Further, when particular elements are disclosed as being "connected," "coupled," or "linked" to other elements, the elements may include not only a case of being directly connected, coupled, or linked to other elements but also a case of being connected, coupled, or linked to other elements by elements between the elements and other elements.

In addition, when one element is disclosed as being formed "on or under" another element, the term "on or under" includes both a case in which the two elements are in direct contact with each other and a case in which at least another element is disposed between the two elements (indirect contact). Further, when the term "on or under" is expressed, a meaning of not only an upward direction but also a downward direction may be included based on one element.

Figure 1:
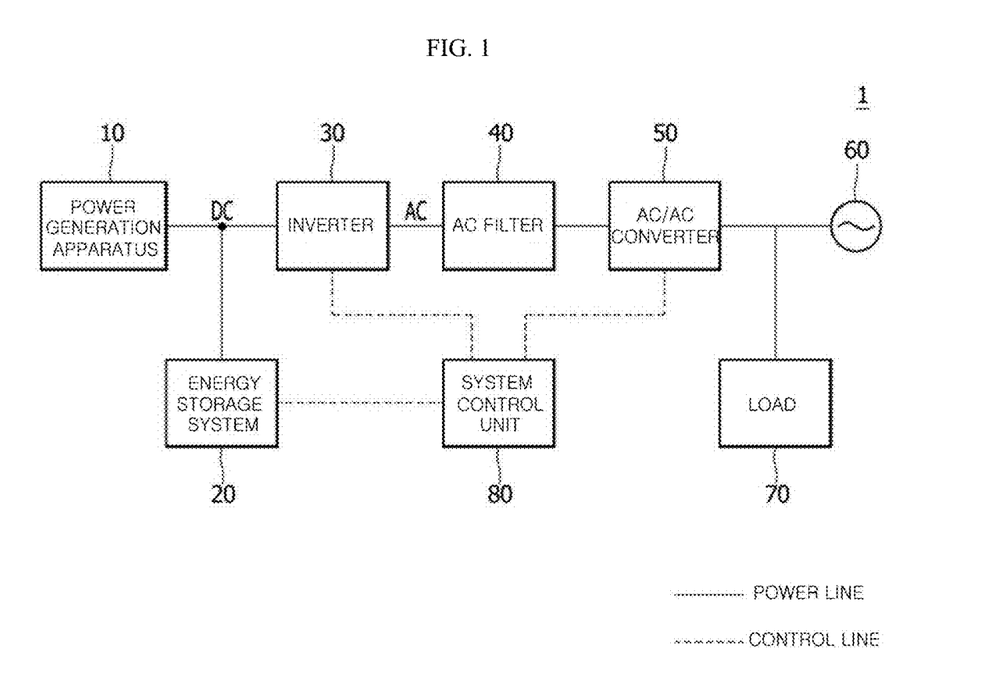
FIG. 1 is a view for describing a schematic configuration of a power supply system according to an embodiment.

Hereinafter, embodiments will be described in detail with reference to the accompanying drawings, and the same reference numerals are granted to the same or corresponding components regardless of the drawing numerals and overlapping descriptions thereof will be omitted FIG. 1 is a view for describing a schematic configuration of a power supply system according to an embodiment. Referring to FIG. 1, a power supply system 1 according to the embodiment includes a power generation apparatus 10, an energy storage system 20, an inverter 30, an alternating current (AC) filter 40, an alternating current/alternating current (AC/AC) converter 50, a system 60, a system control unit 80, and a load 70.

The power generation apparatus 10 may produce electric energy. When the power generation apparatus 10 is a photovoltaic power generation system, the power generation apparatus 10 may be a solar cell array. The solar cell array is a combination of a plurality of solar cell modules. The solar cell module may be a device which converts solar energy to electric energy to generate predetermined voltage and current by connecting a plurality of solar cells in series or parallel. Accordingly, the solar cell array may absorb solar energy and convert the solar energy to the electric energy.

Further, when the power generation apparatus 10 is a wind power generation system, the power generation apparatus 10 may be a fan which converts wind energy to electric energy.

Meanwhile, the power generation apparatus 10 is not limited thereto, and may be configured as a tidal power generation system in addition to the photovoltaic power generation system and the wind power generation system. However, this is only an example, and the power generation apparatus 10 is not limited to the above-mentioned types, and may include all power generation systems which generate electric energy using new renewable energy such as solar heat, geothermal heat, or the like.

Further, the power supply system 1 may supply power only through the energy storage system 20 without the power generation apparatus 10.

In this case, the power supply system 1 may not include the power generation apparatus 10.

The inverter 30 may convert direct current (DC) power to alternating current (AC) power. More specifically, the DC power supplied by the power generation apparatus 10 or the DC power discharged by the energy storage system 20 may be converted to the AC power.

The AC filter 40 may filter a noise of the power converted to the AC power. Further, the AC filter 40 may be omitted according to the embodiment.

The AC/AC converter 50 may convert a magnitude of a voltage of the noise-filtered AC power so that the AC power may be supplied to the system 60 or the load 70, and may supply the converted AC power to the system 60 or the load 70. Further, the AC/AC converter 50 may be omitted according to the embodiment.

The system 60 is a system in which many power plants, substations, transmission and distribution lines, and loads are integrated and thus generation and use of electric power are performed.

The load 70 may receive electric energy from a power generation system such as the power generation apparatus 10 or the like or the energy storage system 20 to consume power.

The energy storage system (ESS) 20 may be charged by receiving electric energy from the power generation apparatus 10, and may discharge the charged electric energy according to a power supply and demand condition of the system 60 or the load 70. More specifically, when the system 60 or the load 70 is in a light load, the energy storage system 20 may receive idle power from the power generation apparatus 10 to perform charging. When the system 60 or the load 70 is in an overload, the energy storage system 20 may discharge the charged power to supply the power to the system 60 or the load 70. Further, the energy storage system 20 may be connected between the power generation apparatus 10 and the inverter 30 to be electrically connected to the power generation apparatus 10 and electrically connected to the inverter 30.

The system control unit 80 may control operations of the energy storage system 20, the inverter 30, and the AC/AC converter 50. More specifically, the system control unit 80 may control charging and discharging of the energy storage system 20. When the system 60 or the load 70 is in an overload, the system control unit 80 may control the energy storage system 20 to supply power and transfer the power to the system 60 or the load 70. When the system 60 or the load 70 is in a light load, the system control unit 80 may control an external power source or the power generation apparatus 10 to supply power and transmit the power to the energy storage system 20.

Figure 2:
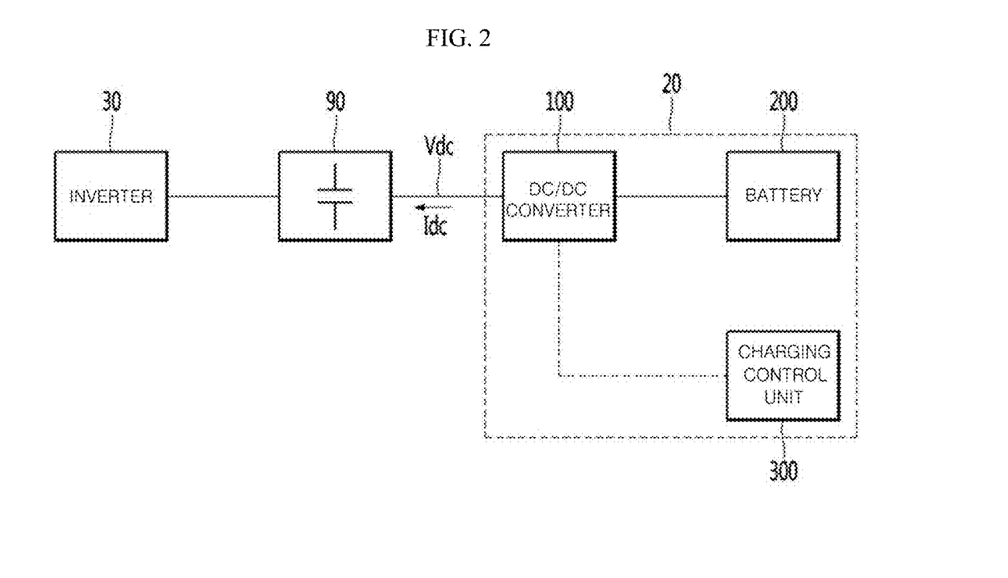
FIG. 2 is a view for describing an energy storage system according to the embodiment.

FIG. 2 is a view for describing the energy storage system according to the embodiment.

Referring to FIG. 2, the energy storage system 20 according to the embodiment may include a direct current/direct current (DC/DC) converter 100, a battery 200, and a charging control unit 300. The energy storage system 20 may be connected to the inverter 30 through a direct current link capacitor 90. That is, the direct current link capacitor 90 may be disposed between the energy storage system 20 and the inverter 30. Accordingly, the energy storage system 20 may receive a direct current (DC) voltage Vdc of the direct current link capacitor 90 in a charging mode, and provide the DC voltage Vdc to the direct current link capacitor 90 in a discharging mode.

The battery 200 may receive charging power from the DC/DC converter 100 in the charging mode, and perform a charging operation using the received power. Further, the battery 200 may output previously stored power to the DC/DC converter 100 in the discharge mode. In addition, the battery 200 may include a plurality of battery cells to perform charging and discharging operations.

The charging control unit 300 may include a battery management system (BMS). The charging control unit 300 may provide battery state information on a state of the battery 200 to the system control unit 80. For example, the charging control unit 300 may monitor at least one or more of a voltage, a current, a temperature, a remaining power amount, and a charging state of the battery 200, and transmit the monitored state information of the battery 200 to the system control unit 80. Further, the charging control unit 300 may make the plurality of battery cells maintain an appropriate voltage while being charged or discharged. In addition, the charging control unit 300 may operate based on a control signal from the system control unit 80. In addition, the charging control unit 300 may control the DC/DC converter 100 according to the monitored state information of the battery 200. In addition, the charging control unit 300 may control the DC/DC converter 100 according to the charging mode or discharging mode. More specifically, the charging control unit 300 may provide a charging control signal or discharging control signal for controlling the DC/DC converter 100 to a converter control unit of the DC/DC converter 100, and the converter control unit of the DC/DC converter 100 may provide a pulse width modulation (PWM) signal to a switch of the DC/DC converter 100 based on the charging control signal or discharging control signal. Further, the charging control unit 300 may control the DC/DC converter 100 to initially charge the direct current link capacitor 90 in the discharge mode of the battery 200. That is, the charging control unit 300 may provide an initial charging control signal for controlling the DC/DC converter 100 to the converter control unit of the DC/DC converter 100, and the converter control unit of the DC/DC converter 100 may provide an initial charging switch signal to the switch of the DC/DC converter 100 based on the initial charging control signal. Further, the charging control unit 300 may control the DC/DC converter 100 to improve power conversion efficiency of the DC/DC converter 100. More specifically, the charging control unit 300 may provide a power conversion efficiency control signal capable of improving the power conversion efficiency of the DC/DC converter 100 to the converter control unit of the DC/DC converter 100, and the converter control unit of the DC/DC converter 100 may provide the PWM signal to the switch of the DC/DC converter 100 based on the power conversion efficiency control signal.

The DC/DC converter 100 may convert a magnitude of the DC power received by the energy storage system 20 in the charging mode or supplied from the energy storage system 20 in the discharging mode. More specifically, the DC/DC converter 100 may convert the DC power provided to the direct current link capacitor 90 from the power generation apparatus 10 or the inverter 30 to a voltage magnitude for charging the battery 200 and provide the DC power to the battery 200. Further, the DC/DC converter 100 may convert the DC power provided from the battery 200 to a voltage magnitude usable by the inverter 30 and provide the DC power to the direct current link capacitor 90.

Figure 3:
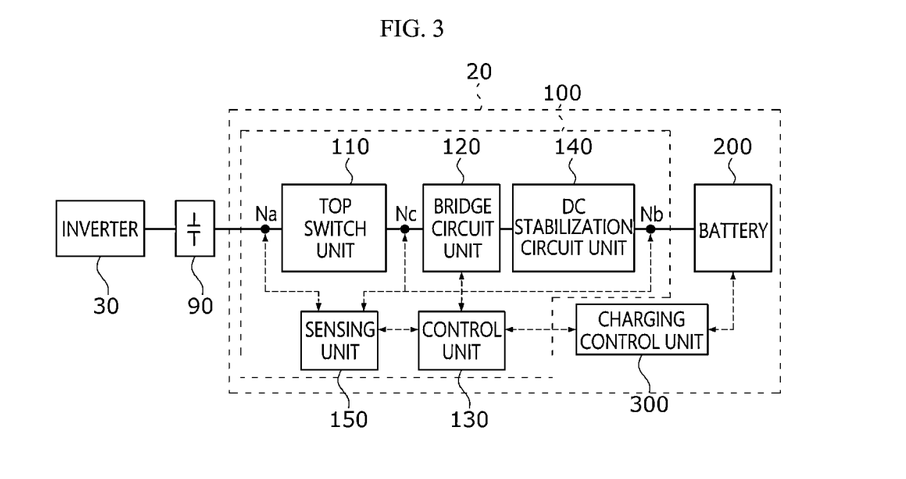
FIG. 3 is a view for describing a direct current/direct current (DC/DC) converter according to the embodiment.

FIG. 3 is a view for describing the DC/DC converter according to the embodiment.

Referring to FIG. 3, the DC/DC converter 100 may convert a magnitude of the DC power received by the energy storage system 20 in the charging mode or supplied from the energy storage system 20 in the discharging mode. That is, the DC/DC converter 100 may be a bidirectional DC/DC converter. More specifically, the DC/DC converter 100 may convert the DC power provided to the direct current link capacitor 90 from the power generation apparatus 10 or the inverter 30 to a voltage magnitude for charging the battery 200 and provide the DC power to the battery 200. Further, the DC/DC converter 100 may convert the DC power provided from the battery 200 to a voltage magnitude usable by the inverter 30 and provide the DC power to the direct current link capacitor 90. In addition, the DC/DC converter 100 may operate in the charging mode, a standby mode, and the discharging mode based on a voltage provided from the direct current link capacitor 90. That is, the DC/DC converter 100 may monitor the voltage provided from the direct current link capacitor 90 even when a control signal is not provided by the charging control unit 300, determine whether to operate in the charging mode, the standby mode, and the discharging mode, and operate.

The DC/DC converter 100 may include a top switch unit 110, a bridge circuit unit 120, a control unit 130, a direct current stabilization circuit unit 140, and a sensing unit 150.

The control unit 130 may control the bridge circuit unit 120. For example, the control unit 130 may generate a PWM signal based on the control signal provided from the charging control unit 300 and provide the PWM signal to the bridge circuit unit 120 including a switch. As another example, the control unit 130 may determine an operation mode and reference power according to the magnitude of the voltage provided from the direct current link capacitor 90. Further, the control unit 130 may generate a PWM signal based on the determined reference power and provide the PWM signal to the bridge circuit unit 120 including the switch.

The top switch unit 110 may inhibit electrical overstress (EOS) or overcurrent from being introduced into or discharged from the energy storage system 20. The top switch unit 110 may be disposed between a first end Na to which the direct current link capacitor 90 is connected and the bridge circuit unit 120. Further, the top switch unit 110 may include a circuit breaker (not shown). In this case, the top switch unit 110 may open between the first end Na and the bridge circuit unit 120 when EOS or overcurrent is introduced into the energy storage system 20. Accordingly, the top switch unit 110 may block input/output of an external current to/from the energy storage system 20.

The bridge circuit unit 120 may be disposed between the top switch unit 110 and the direct current stabilization circuit unit 140 and electrically connected to each component. The bridge circuit unit 120 may drop the DC voltage of the DC power input from the top switch unit 110 in a step-down mode and output the DC voltage to the direct current stabilization circuit unit 140. Further, the bridge circuit unit 120 may raise the DC voltage of the DC power input from the direct current stabilization circuit unit 140 in a step-up mode and output the DC voltage to the top switch unit 110. The bridge circuit unit 120 may include one or more switches. For example, the bridge circuit unit 120 may be an insulated full bridge circuit. As another example, the bridge circuit unit 120 may be an uninsulated full bridge circuit. The present invention is not limited thereto, and the bridge circuit unit 120 may be configured as a half bridge circuit. The bridge circuit unit 120 may operate based on the PWM signal of the control unit 130.

The direct current stabilization circuit unit 140 may operate to raise the DC voltage in the step-up mode of the bridge circuit unit 120 and drop the DC voltage in the step-down mode. Further, the direct current stabilization circuit unit 140 may be an LC filter. The direct current stabilization circuit unit 140 may be connected to a second end Nb.

The sensing unit 150 may sense the voltage and current of the first end Na and provide the sensed voltage and current to the control unit 130. The voltage and current of the first end Na may be a DC voltage and a DC current provided by the direct current link capacitor 90.

Further, the sensing unit 150 may sense the voltage and current of the second end Nb and provide the sensed voltage and current to the control unit 130. The voltage and current of the second end Nb may be a DC voltage and a DC current provided to the battery 200 by the DC/DC converter.

Further, the sensing unit 150 may sense the voltage and current of a third end Nc and provide the sensed voltage and current to the control unit 130. The voltage and current of the third end Nc may be the voltage and current at a contact point of the top switch unit 110 and the bridge circuit unit 120.

The sensing unit 150 may be controlled by the control unit 130. Accordingly, in another embodiment, an operation mode of charging or discharging of the battery may be quickly determined. Further, in still another embodiment, a separate communication line and communication unit for droop control when the battery is charged or discharged are not required. In addition, in yet another embodiment, the quick droop control may be performed when the battery is charged or discharged.

Figure 4:
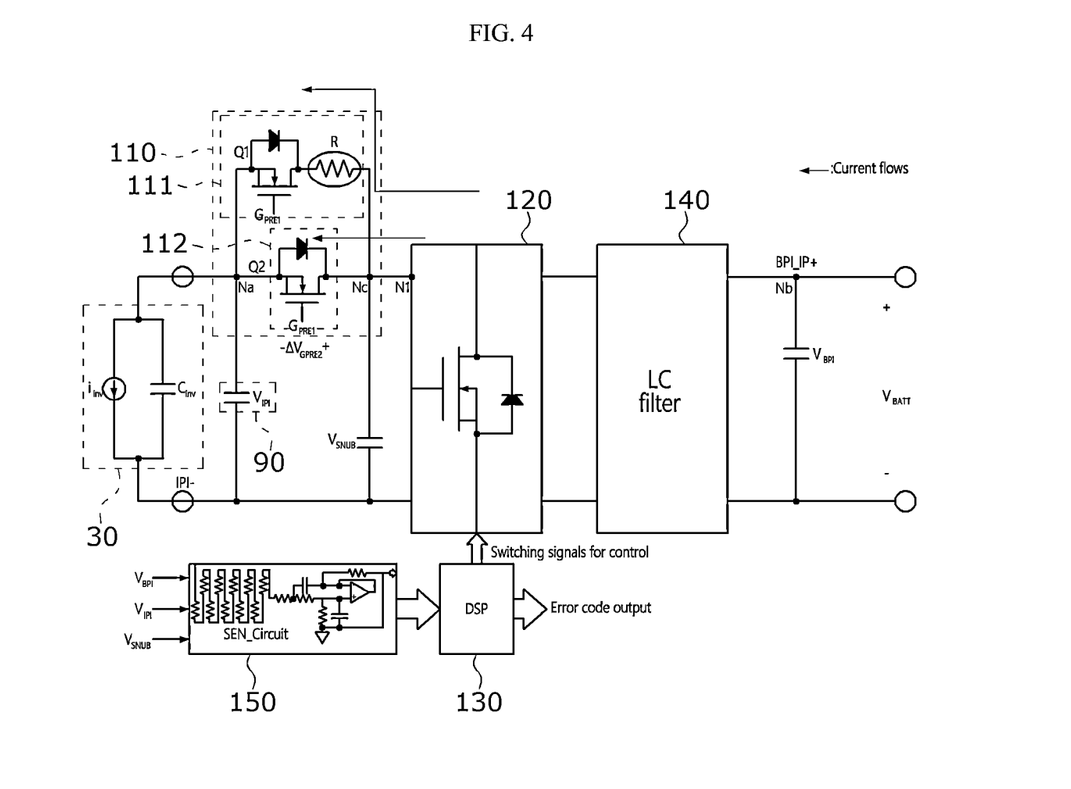
FIG. 4 is a circuit diagram of the DC/DC converter according to the embodiment.

FIG. 4 is a circuit diagram of the DC/DC converter according to the embodiment.

Referring to FIG. 4, the control unit 130 of the DC/DC converter 100 according to the embodiment may generate a PWM signal based on a control signal provided from the charging control unit 300, and provide the PWM signal to the top switch unit 110 including the switch or the bridge circuit unit 120.

In FIG. 4, arrows indicate moving paths of the currents.

The top switch unit 110 may include a first switch unit 111 and a second switch unit 112. The second switch unit 112 may include a second switch element Q2 disposed between one end of the direct current link capacitor 90 and a first node NI. The first switch unit 111 may be connected in parallel with the second switch unit 112. The first switch unit 111 may include a first switch element Q1 and a resistor R. In the first switch element Q1, one side may be connected to one end of the direct current link capacitor 90 and the other side may be connected to one side of the resistor R. In the resistor R, one side may be connected to the other side of the first switch element Q1 and the other side may be connected to the bridge circuit unit 120. The resistor R may make a current of a lower level than a current flowing through the first switch unit 111 flow through the first switch unit 111.

The bridge circuit unit 120 may be disposed between the top switch unit 110 and the direct current stabilization circuit unit 140.

The direct current stabilization circuit unit 140 may connect between the bridge circuit unit 120 and the battery 200.

The sensing unit 150 may sense the voltage and current of the first end Na and provide the sensed voltage and current to the control unit 130. The voltage of the first end Na may be the DC voltage and the DC current provided by the direct current link capacitor 90.

Further, the sensing unit 150 may sense the voltage and current of the second end Nb and provide the sensed voltage and current to the control unit 130. The voltage and current of the second end Nb may be the DC voltage and the DC current provided to the battery 200 by the DC/DC converter.

Further, the sensing unit 150 may sense the voltage and current of the third end Nc and provide the sensed voltage and current to the control unit 130. The voltage of the third end Nc may be the voltage and current at a contact point of the top switch unit 110 and the bridge circuit unit 120.

The sensing unit 150 may be controlled by the control unit 130.

When the DC/DC converter 100 according to the embodiment operates in the step-down mode which is a charging mode, or operates in the step-up mode operation which is a discharging mode, the second switch unit 112 may be turned on/off and the first switch unit 111 may maintain an off state. Further, in an initial charging mode of the DC/DC converter 100 before starting the discharging mode, the second switch unit 112 may maintain an off state and the first switch unit 111 may be turned on/off.

Accordingly, the energy storage system according to the embodiment may initially charge the direct current link capacitor without a separate configuration before operating in the discharge mode. Further, since the energy storage system according to the embodiment gradually increases the DC current provided to the direct current link capacitor, an initial charging speed may be fast and the battery discharging operation may be quickly performed.

According to the embodiment, the control unit 130 may control an on-off operation of the first switch unit 111 and second switch unit 112, and determine whether a short circuit and a disconnection of the inverter occur using a voltage across both ends of the inverter and a voltage across both ends of the second switch unit 112.

Further, the control unit 130 may output at least one of a control command for stopping an operation of the DC/DC converter 100 and a control command for reducing a voltage of an inverter end when the short circuit or disconnection occurs. For example, the control unit 130 may block introduction of the current by operating the circuit breaker of the top switch unit 110 when the short circuit or disconnection occurs.

The control unit may determine whether the short circuit and the disconnection occur using the voltage across both ends of the inverter and the voltage across both ends of the second switch unit 112, which are measured when the first switch unit 111 is turned on and the second switch unit 112 is turned off.

The control unit 130 may operate the first switch unit 111 in an on state, and determine whether a short circuit (short) occurs after a first set time has elapsed. Specifically, the control unit 130 may determine whether the short circuit occurs by comparing a preset first reference voltage value and a preset first reference current value with a first inverter voltage value and a first inverter current value measured at both ends of the inverter after the first set time has elapsed. The first set time may be set to a predetermined time after the first switch unit 111 is converted to the on state. For example, the first set time may be set to 5 ms, but is not limited thereto. The control unit 130 may calculate the first inverter voltage value and the first inverter current value using the voltage and current of the first end Na sensed by the sensing unit 150, and determine whether the short circuit occurs by comparing the first inverter voltage value and the first inverter current value with the preset first reference voltage value and the preset first reference current value.

Further, the control unit 130 may determine whether the short circuit and the disconnection (open) occur after a second set time has elapsed. Specifically, the control unit 130 may determine whether the short circuit and the disconnection occur by comparing a preset second reference voltage value and a preset second reference current value with a second inverter voltage value and a second inverter current value measured at both ends of the inverter after the second set time has elapsed. The second set time may be set to be longer than the first set time. For example, the second set time may be set to 10.0 ms, but is not limited thereto. The control unit 130 may calculate the second inverter voltage value and the second inverter current value using the voltage and the current of the first end Na sensed by the sensing unit 150, and may determine whether the short circuit and the disconnection occur by comparing the second inverter voltage value and the second inverter current value with the preset second reference voltage value and the preset second reference current value.

Further, the control unit 130 may determine whether the short circuit occurs by comparing the voltage across both ends of the second switch unit 112 and a preset voltage. Specifically, the control unit 130 may determine that the short circuit occurs when the voltage across both ends of the second switch unit 112 is maintained under the preset voltage for a preset time. For example, the control unit 130 may determine that the short circuit occurs when the voltage across both ends of the second switch unit 112 is maintained under 10 [V] for 0.1 s. The control unit 130 may calculate a value of the voltage across both ends of the second switch unit 112 using the voltage of the third end Nc sensed by the sensing unit 150, and may determine the short circuit occurs by comparing the value of the voltage across both ends of the second switch unit 112 with the preset voltage value. Alternatively, the control unit 130 may estimate the voltage across both ends of the second switch unit 112 using a voltage across both ends of the battery 200. In this case, the control unit 130 may estimate the voltage across both ends of the second switch unit 112 using the voltage of the second end Nb sensed by the sensing unit 150.

Further, the control unit 130 may determine whether the disconnection occurs using the voltage across both ends of the inverter, which is measured when the second switch unit 112 is turned on and the first switch unit 111 is turned off. The control unit 130 may determine whether the disconnection occurs after a third set time has elapsed after operating the second switch unit 112 in the on state, and turning off the first switch unit 111. In this case, the control unit 130 may determine whether the disconnection occurs after making the DC/DC converter 100 enter the charging mode. Specifically, the control unit 130 may determine whether the disconnection occurs by comparing a preset third reference voltage value and a preset third reference current value with a third inverter voltage value and a third inverter current value measured at both ends of the inverter after the third set time has elapsed. The third set time may be set to a predetermined time after the second switch unit 112 is converted to an on state and the first switch unit 111 is converted to an off state. For example, the third set time may be set to 10.0 ms, but is not limited thereto. The control unit 130 may calculate the third inverter voltage value and the third inverter current value using the voltage and the current of the first end Na sensed by the sensing unit 150, and may determine whether the disconnection occurs by comparing the third inverter voltage value and the third inverter current value with the preset third reference voltage value and the preset third reference current value.

Further, when it is determined that the disconnection occurs in a state of the charging mode, the control unit 130 may enter the discharging mode and reduce the inverter voltage. The control unit 130 may determine whether the disconnection additionally occurs in a state in which the voltage of the inverter end is reduced. The control unit 130 may determine whether the disconnection occurs by comparing the preset third reference voltage value and the preset third reference current value with the third inverter voltage value and the third inverter current value measured at both ends of the inverter in a state of entering the discharging mode. The control unit 130 may block introduction of the current even after entering the discharge mode by operating the circuit breaker of the top switch unit 110 when it is determined that the disconnection continuously occurs.

Figure 5:
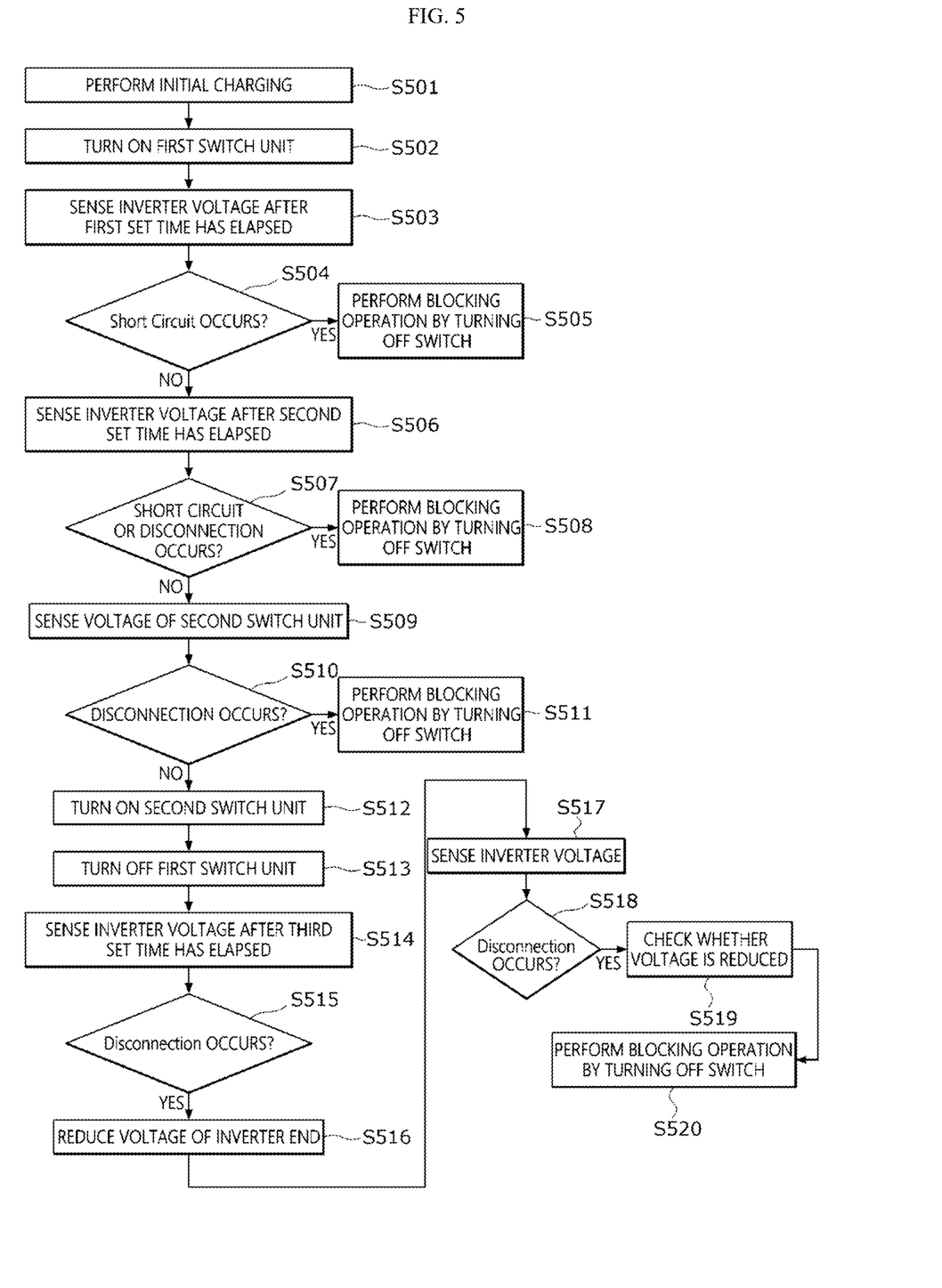
FIG. 5 is a flow chart of an operation of the DC/DC converter according to the embodiment.

FIG. 5 is a flow chart of an operation of the DC/DC converter according to the embodiment.

According to the embodiment, first, a voltage difference between a battery and an inverter may be reduced and an inrush current may be blocked by initially charging (or pre-charging) a direct current link capacitor disposed at an input end of the inverter (S501).

Next, a control unit may turn on a first switch unit located between the direct current link capacitor and a bridge circuit unit (S502).

Next, a sensing unit may measure the voltage and current across both ends of the inverter after a first set time has elapsed (S503).

Next, the control unit determine whether a short circuit occurs by comparing a preset first reference voltage value and a preset first reference current value with a first inverter voltage value and a first inverter current value measured at both ends of the inverter (S504).

When it is determined that the short circuit occurs, the control unit may block the introduction of the current by operating a top switch unit (S505).

Next, the sensing unit may measure the voltage and current across both ends of the inverter after a second set time has elapsed (S506).

Next, the control unit may determine whether the short circuit and the disconnection occur by comparing a preset second reference voltage value and a preset second reference current value with a second inverter voltage value and a second inverter current value measured at both ends of the inverter (S507).

When it is determined that the disconnection or short circuit occurs, the control unit may block the introduction of the current by operating the top switch unit (S508).

Next, the sensing unit may measure the voltage across both ends of a second switch unit connected in parallel with the first switch unit (S509).

Next, the control unit may determine whether the short circuit occurs by comparing the voltage across both ends of the second switch unit and a preset voltage. The control unit may determine that the short circuit occurs when the voltage across both ends of the second switch unit is maintained under the preset voltage for a preset time (S510).

When it is determined that the short circuit occurs, the control unit may block the introduction of the current by operating the top switch unit (S511).

Next, the control unit may turn on the second switch unit (S512).

Next, the control unit may turn off the first switch unit. Accordingly, the converter may enter a charging mode (S513).

Next, the sensing unit may measure the voltage and current across both ends of the inverter after a third set time has elapsed (S514).

Next, the control unit may determine whether the disconnection occurs by comparing a preset third reference voltage value and a preset third reference current value with a third inverter voltage value and a third inverter current value measured at both ends of the inverter (S515).

Next, when it is determined that the disconnection occurs in the charging mode state, the control unit may enter a discharging mode and reduce the voltage of the inverter end (S516).

Next, the sensing unit may measure the voltage and current across both ends of the inverter (S517).

Next, the control unit may determine whether the disconnection additionally occurs in the discharging mode. The control unit may determine whether the disconnection occurs by comparing the comparing the preset third reference voltage value and the preset third reference current value with the third inverter voltage value and the third inverter current value measured at both ends of the inverter, and then checking whether the voltage is reduced in the state of entering the discharging mode (S518 and S519).

The control unit may block the introduction of the current by operating the top switch unit 110 when it is determined that the disconnection continuously occurs even after entering the discharge mode (S520).

Figure 6A:
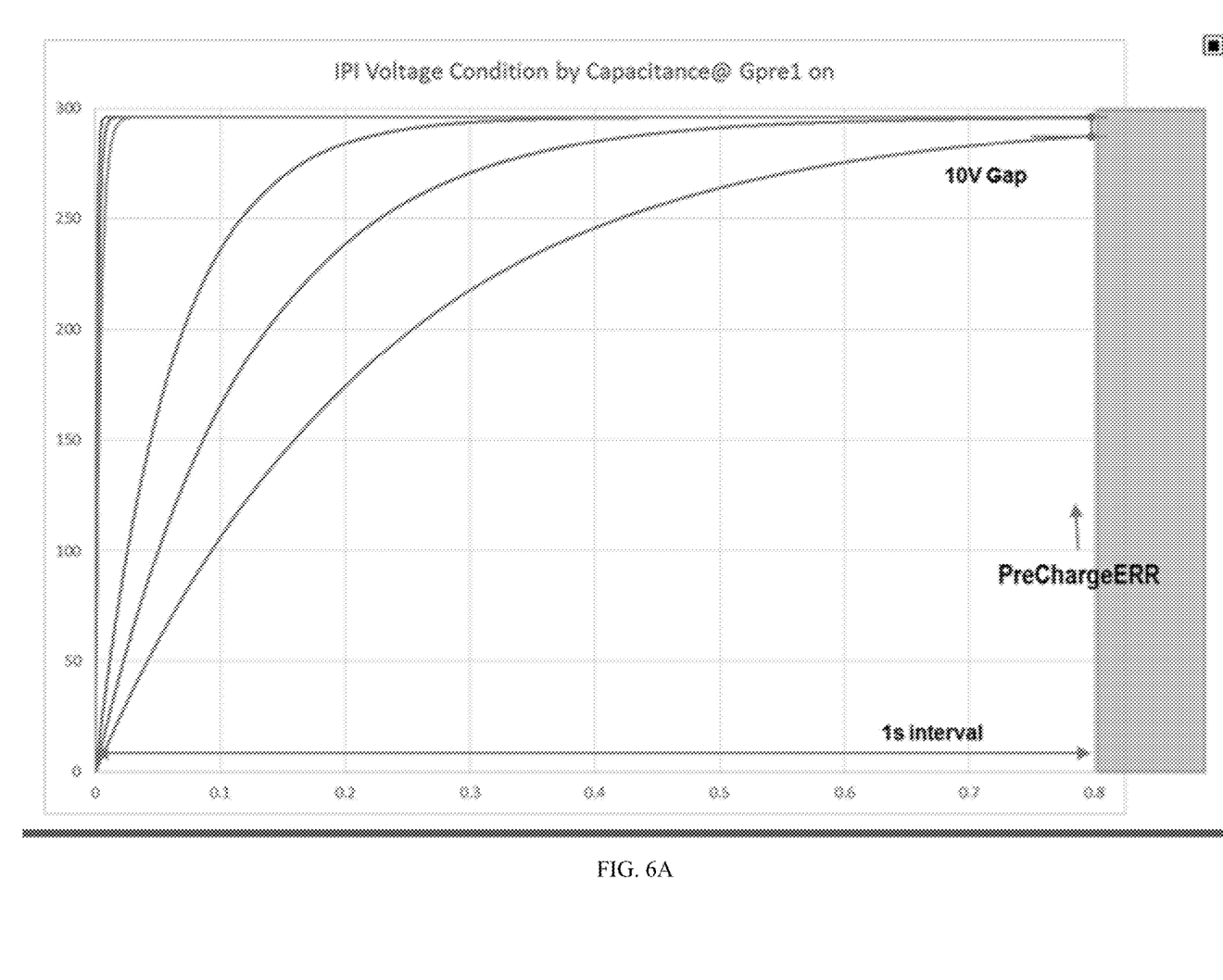
FIGS. 6A-6D are views of a result of testing detection performance of a short circuit and a disconnection of the DC/DC converter according to the embodiment.
Figure 6B:
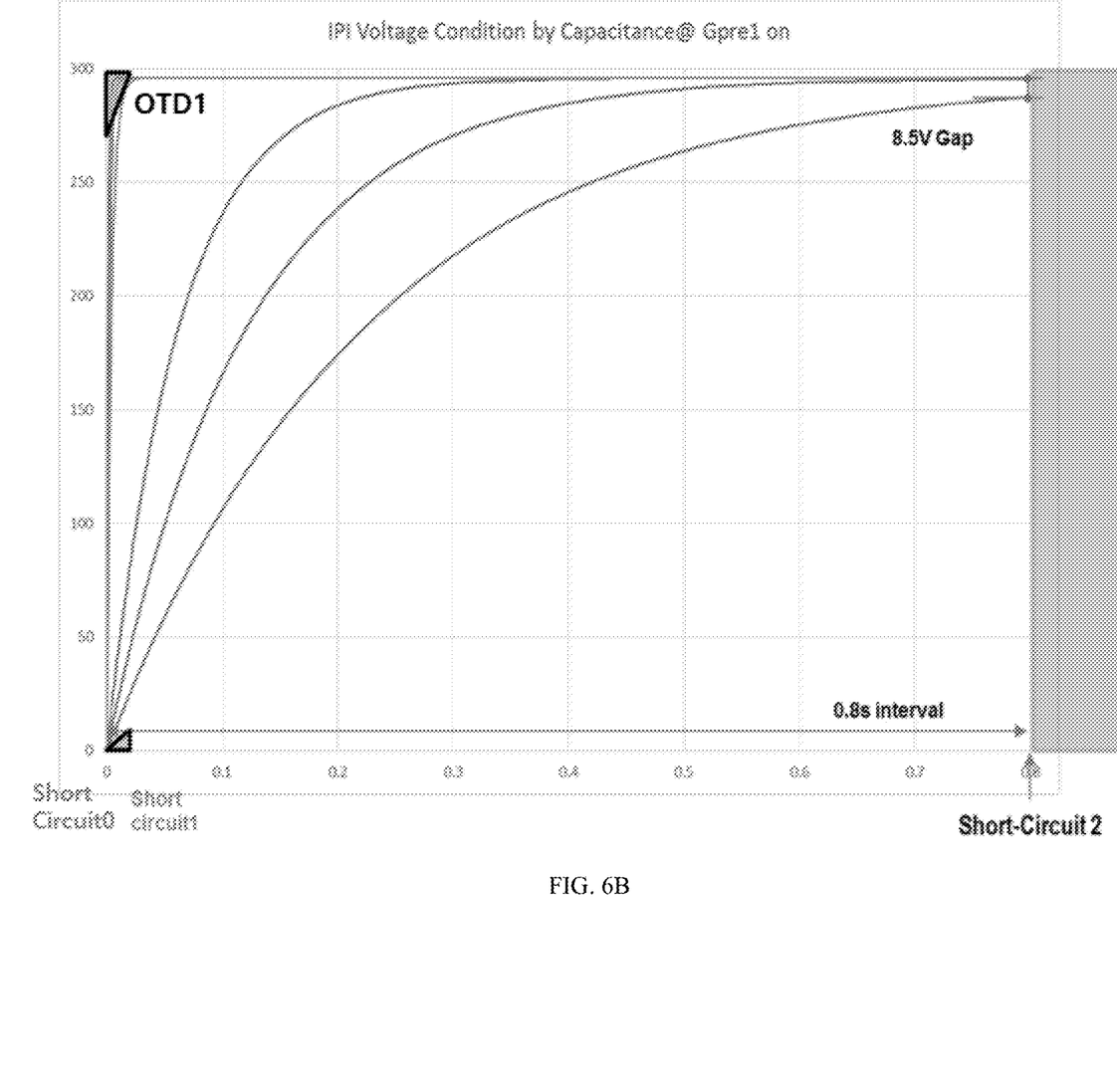
Figure 6C:
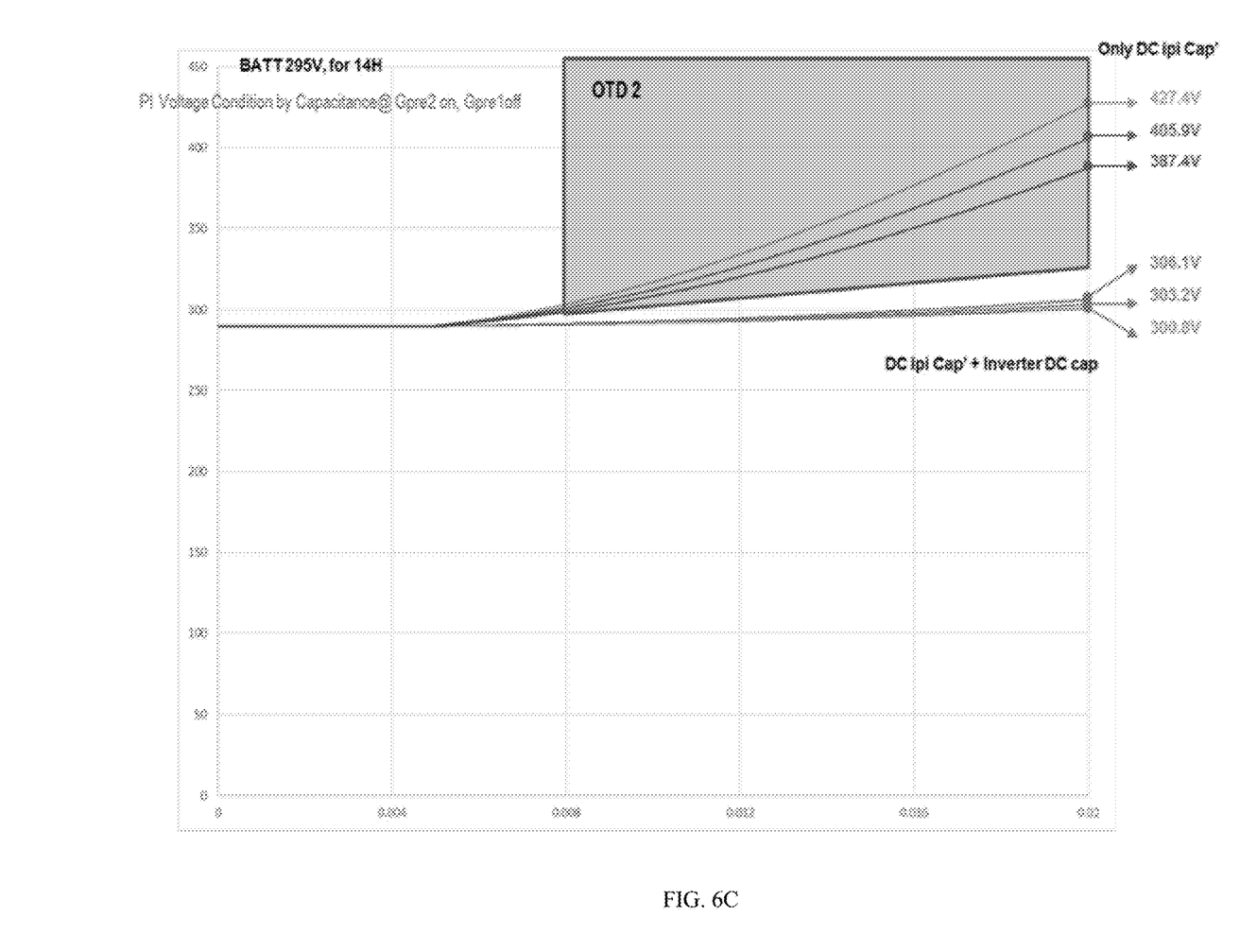
Figure 6D:
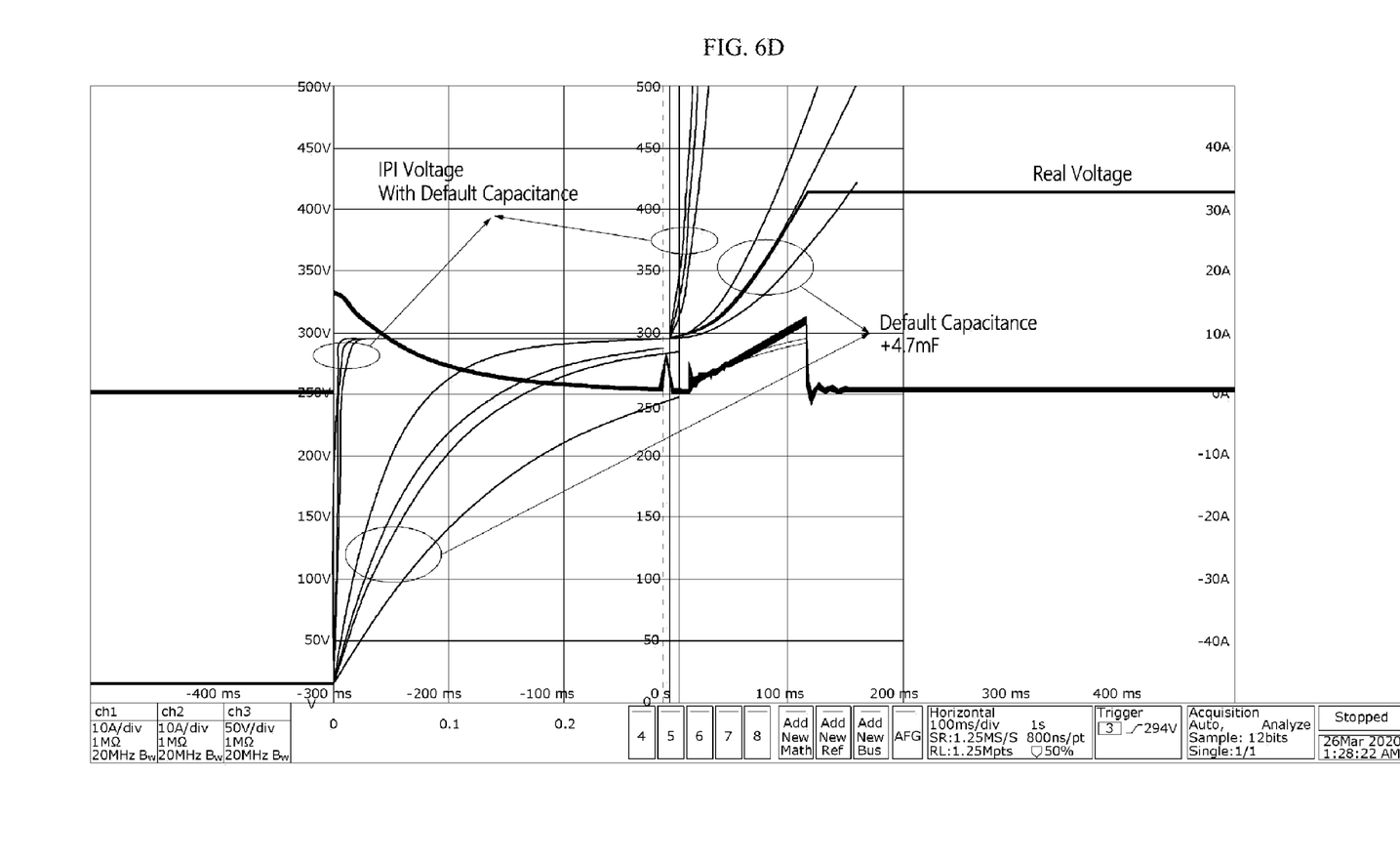

FIGS. 6A-6D are views of a result of testing detection performance of the short circuit and the disconnection of the DC/DC converter according to the embodiment. Referring to FIG. 6A, since an existing DC/DC converter performs initial charging without determining whether a short circuit and a disconnection occur, it can be seen that an error PreChargeERR according to the short circuit or disconnection occurs during the initial charging. In comparison of this, referring to FIG. 6B, the DC/DC converter according to the embodiment may determine whether two short circuits occur (Short Circuit 0 and 1) and whether one disconnection occurs (OTD1) in a state in which the first switch unit is initially turned on. Further, referring to FIG. 6C, by determining whether an additional disconnection occurs (OTD2) in a state in which the first switch unit is converted to the off state and the second switch unit is turned on, as shown in FIG. 6D, there is a technical effect in that a stable initial operation can be performed.

The term '-unit' used in the embodiment refers to software or a hardware component such as a field-programmable gate array (FPGA) or an application-specific integrated circuit (ASIC), and the '-unit' performs certain roles. However, the '-unit' is not a meaning limited to the software or hardware.

The '-unit' may be configured to be present in an addressable storage medium, and may be configured to play one or more processors. Accordingly, for example, the '-unit' includes components such as software components, object oriented software components, class components, and task components, processes, functions, properties, procedures, subroutines, segments of program code, drivers, firmware, microcode, circuits, data, databases, data structures, tables, arrays, and variables. Functions provided in the components and the '~units' may be combined into a smaller number of components and '~units' or further separated into additional components and '-units'. Further, the components and the '~units' may be implemented to play one or more central processing units (CPUs) in a device or a security multimedia card.

Although the preferable embodiments of the present invention are described above, those skilled in the art may variously modify and change the present invention within the scope and spirit of the present invention disclosed in the following claims.

The invention claimed is:

1. A direct current/direct current (DC/DC) converter control method comprising:
    turning on a first switch unit located between a direct current link capacitor and a bridge circuit unit;
    determining whether a short circuit (short) occurs after a first set time has elapsed;
    determining whether the short circuit and a disconnection (open) occur after a second set time has elapsed;
    measuring a voltage across both ends of a second switch unit connected in parallel with the first switch unit;
    comparing the voltage across both ends of the second switch unit and a preset voltage to determine whether the short circuit occurs;
    turning on the second switch unit;
    turning off the first switch unit; and
    determining whether the disconnection occurs after a third set time has elapsed from a time when the first switch unit is turned off.

2. The DC/DC converter control method of claim 1, wherein the determining of whether the short circuit (short) occurs after the first set time has elapsed includes comparing a preset first reference voltage value and a preset first reference current value with a first inverter voltage value and a first inverter current value measured at both ends of an inverter and determining whether the short circuit occurs.

3. The DC/DC converter control method of claim 1, wherein the determining of whether the short circuit and the disconnection (open) occur after the second set time has elapsed includes comparing a preset second reference voltage value and a preset second reference current value with a second inverter voltage value and a second inverter current value measured at both ends of an inverter and determining whether the short circuit and the disconnection occur.

4. The DC/DC converter control method of claim 1, wherein the determining of whether the disconnection occurs after the third set time has elapsed includes comparing a preset third reference voltage value and a preset third reference current value with a third inverter voltage value and a third inverter current value measured at both ends of an inverter and determining whether the short circuit and the disconnection occur.

5. The DC/DC converter control method of claim 1, wherein the comparing of the voltage across both ends of the second switch unit and the preset voltage to determine whether the short circuit occurs includes determining that the short circuit occurs when the voltage across both ends of the second switch unit is maintained under the preset voltage for a preset time.

6. The DC/DC converter control method of claim 1, comprising outputting at least one of a control command for stopping an operation of a converter and a control command for reducing a voltage of an inverter end when the short circuit or the disconnection occurs.

7. A direct current/direct current (DC/DC) converter comprising:
    a first switch unit located between a direct current link capacitor and a bridge circuit unit;
    a second switch unit connected in parallel with the first switch unit;
    a sensing unit configured to sense a voltage across both ends of an inverter and a voltage across both ends of the second switch unit; and
    a control unit configured to control an on-off operation of the first switch unit and the second switch unit, and determine whether a short circuit and a disconnection occur using the voltage across both ends of the inverter and the voltage across both ends of the second switch unit,
    wherein the control unit determines whether the short circuit and the disconnection occur using the voltage across both ends of the inverter and the voltage across both ends of the second switch unit, which are measured when the first switch unit is turned on and the second switch unit is turned off, and determines whether the disconnection occurs using the voltage across both ends of the inverter, which is measured when the second switch unit is turned on and the first switch unit is turned off.

8. The DC/DC converter of claim 7, wherein the first switch unit includes a resistor element and a switching element connected to the resistor element in series.

9. The DC/DC converter of claim 7, wherein the control unit sequentially performs arithmetic operations of determining whether a short circuit (short) occurs after a first set time has elapsed after turning on the first switch unit, determining whether the short circuit and a disconnection (open) occur after a second set time has elapsed, and comparing the voltage across both ends of the second switch unit and a preset voltage to determine whether the short circuit occurs, and determines whether the disconnection occurs after a third set time has elapsed after turning on the second switch unit and turning off the first switch unit.

10. The DC/DC converter of claim 9, wherein the control unit outputs at least one of a control command for stopping an operation of a converter and a control command for reducing a voltage of an inverter end when the short circuit or the disconnection occurs.

11. The DC/DC converter of claim 9, wherein the control unit compares a preset first reference voltage value and a preset first reference current value with a first inverter voltage value and a first inverter current value measured at both ends of the inverter after a first set time has elapsed to determine whether the short circuit occurs.

12. The DC/DC converter of claim 9, wherein the control unit compares a preset second reference voltage value and a preset second reference current value with a second inverter voltage value and a second inverter current value measured at both ends of the inverter after the second set time has elapsed to determine whether the short circuit and the disconnection occur.

13. The DC/DC converter of claim 9, wherein the control unit compares a preset third reference voltage value and a preset third reference current value with a third inverter voltage value and a third inverter current value measured at both ends of the inverter after the third set time has elapsed to determine whether the short circuit and the disconnection occur.

14. The DC/DC converter control method of claim 6, comprising blocking introduction of a current by operating a circuit breaker of a top switch unit including the first switch unit and the second switch unit when the short circuit or the disconnection occurs.

15. The DC/DC converter control method of claim 1, wherein the second set time is set to be longer than the first set time.

16. The DC/DC converter of claim 7, wherein the control unit determines that the short circuit occurs when the voltage across both ends of the second switch unit is maintained under a preset voltage for a preset time.

17. The DC/DC converter of claim 7, wherein the control unit comprises blocking introduction of a current by operating a circuit breaker of a top switch unit including the first switch unit and the second switch unit when the short circuit or the disconnection occurs.

18. The DC/DC converter of claim 9, wherein the second set time is set to be longer than the first set time.

19. The DC/DC converter of claim 7, wherein the first switch unit includes a first switching element and a resistor.

20. The DC/DC converter of claim 19, wherein the first switch element has one side connected to one end of the direct current link capacitor and an other side connected to one side of the resistor, and the resistor has one side connected to the other side of the first switch element and an other side connected to the bridge circuit unit.

* * * * *